United States Patent Office 2,824,823
Patented Feb. 25, 1958

2,824,823

TRIAZINE FUNGICIDAL COMPOSITIONS AND METHOD OF APPLYING

Calvin N. Wolf, New York, N. Y., assignor, by mesne assignments, to Pittsburgh Coke and Chemical Company, a corporation of Pennsylvania No Drawing. Application September 10, 1954
Serial No. 455,358

11 Claims. (Cl. 167—33)

This invention relates to novel fungitoxic compositions. In particular my invention relates to the protection of materials susceptible to fungus attack by incorporating therewith, or applying thereto, certain triazine fungitoxicants to be hereinafter described. My invention also relates to methods of formulating such compounds into useful fungicides and methods of their application.

The broad class of compounds known as 1,3,5-triazines, or s-triazines, have been known for some time as chemical intermediates. However, it has not been known prior to my discovery thereof that by inclusion of certain selected groups into the 1,3,5-triazine nucleus and proper admixture with relatively fungicidally inert surface-contacting agents an important class of extremely effective fungicides can be obtained.

By the term "fungitoxicants" I mean to include not only the property of destroying fungi but also the property of inhibiting the germination of the spores, or the sporulation, of the fungi a property sometimes also referred to as fungistatic.

It is an object of my invention to provide materials, and compositions and formulations thereof, which are effective in preventing fungicidal attack. It is a further object of my invention to provide compositions which can be applied to materials normally susceptible to attack by fungus organisms and which prevent such attack. It is a further object of my invention to provide a group of organic materials which provide such protection against a diversity of fungus organisms and under a diversity of conditions of use, and to a diversity of materials. Additional objects will be apparent from a consideration of the following description and claims.

The fungitoxic agents in my compositions are tri-substituted 1,3,5-triazines. My preferred materials are chloro aryloxy 1,3,5-triazines. In general my preferred fungitoxic materials comprise those tri-(C-substituted)-1,3,5-triazines, wherein one to two substituents are chlorine and the remainder are aryloxy. In other words they comprise those tri-(C-substituted)-1,3,5-triazines, wherein at least one substituent is chlorine, one aryloxy and the third substituent selected from the group consisting of chlorine and aryloxy. While it is essential that there be at least one such aryloxy group on the 1,3,5-triazine nucleus of the compounds of my invention, I do not intend that the meaning of the term aryl should be limited to a hydrocarbon group nor that when two such aryl groups are present that they be identical. Thus I can supply the fungitoxic 1,3,5-triazines of my invention wherein the aryloxy group is further substituted with halogen, and in particular one or more chlorine atoms. Furthermore such aryl groups are not limited to phenyl as polynuclear aromatic groups function satisfactorily and for some uses are preferred.

Employed directly in undiluted form the triazines of my invention exhibit undesirable properties. For example, in agricultural applications these materials are phytotoxic to certain plant species, causing burning and withering of the plant parts treated, and in some instances even death of the entire plant may result. However, I have made the discovery that by proper admixture with certain diluents that act as surface-contacing agents these same triazines can be safely used for all applications where a fungus growth is to be inhibited. The mode of operation by which this protection is safely provided is not clearly understood. Such diluents actually bring the fungicide into intimate contact with the surface being protected and therefore provide more than a diluent effect. However, in spite of such intimate contact, when properly applied my materials are non-injurious to the delicate plan organisms and possess little or no phytotoxicity over a wide range of concentration. The significance of a carrier, in particular of the surface contacting type, is equally borne out in considering the application of my fungitoxicants to inanimate material such as textiles, painted surfaces and the like. Aside from the ability to provide a uniform application of the active ingredient and induce uniform spreading, the surface contacting agent increases the activity of the fungitoxicant per unit weight by providing the material in a highly dispersed form. The mechanism by which such surface contacting agents provide these and other advantages is little understood. However, one significant function is believed to be the provision of increased penetrability of the fungitoxicant with respect to the waxy membrane surrounding the fungus spore.

Among the simpler members of the class of materials which I have discovered to have unusual fungitoxic properties are 2-chloro-4,6-bis-(phenoxy)-triazine and 2,4-dichloro-6-phenoxy-triazine. Among the aryloxy groups which can be substituted in my triazine fungicides typical examples include phenyl, diphenyl, $\alpha$-naphthyl, $\beta$-naphthyl, phenanthryl and anthracyl. In the latter examples, the polynuclear aryl group can be attached to the oxygen atom through any of several positions. Hydrocarbon substituted derivatives of the above typical aryl groups can also be employed. For example, the aryl group can be substituted with a straight chain aliphatic radical such as methyl, ethyl, propyl, hexyl and up to about dodecyl, or the isomeric or branched chain equivalents thereof such as, for example, isopropyl, isobutyl, sec.-butyl and the various branched chain amyl, hexyl, nonyl and higher aliphatic radicals, etc. Furthermore, these aryl groups can be substituted with endoaliphatic groups, for example methylene, ethylene, propylene and butylene, to provide the corresponding phenyl endo-methylene, phenyl endo-ethylene, hydrindene and tetralin radicals. Likewise the aryl group can be further substituted with the same or other aryl group. Other examples of such embodiments of the compounds of my invention include those triazines as defined above wherein the epoxy atom contains acenaphthene, and fluorene groups.

Specific examples of such 1,3,5-triazine fungicides of my invention include 2-chloro-4,6-bis (p-phenylphenoxy)-triazine, 2,4-dichloro-6-(p-phenylphenoxy)-triazine, 2-chloro-4,6-bis (o-phenylphenoxy)-triazine, 2,4-dichloro-6-(o-phenylphenoxy)-triazine, 2-chloro-4,6-bis ($\alpha$-naphthoxy)-triazine, 2,4-dichloro-6-($\alpha$-naphthoxy)-triazine, 2-chloro-4,6-bis ($\beta$-naphthoxy)-triazine, 2,4-dichloro-6-($\beta$-naphthoxy)-triazine, 2-chloro-4-phenoxy - 6 - ($\alpha$ - naphthoxy)-triazine, 2-chloro-4-(p-phenylphenoxy)-6-($\beta$-naphthoxy)-triazine, 2-chloro-4,6-bis (9-phenanthroxy)-triazine, 2,4-dichloro-6-(p-tolyloxy)-triazine, 2-chloro-4(2,4- dimethylphenoxy)-6-phenoxy-triazine, 2,4-dichloro-6-(3-dodecylphenoxy)-triazine, 2,4-dichloro - 6 - (4-(mixed)-amylphenoxy)-triazine, 2-chloro-4-phenoxy-6-(4-hydrindenyloxy)-triazine, 2,4-dichloro-6-(3-acenaphthoxy)-triazine and the like.

In addition to such substituents the aryl groups essential to the 1,3,5-triazines of my invention can contain corresponding unsaturated radicals such as for example the vinyl, propenyl, allyl groups, etc. For example, such typical fungicidal triazines of my invention include 2 -chloro - 4,6 - bis(p - vinylphenoxy) - triazine, 2,4-dichloro - 6 - (o - propenylphenoxy) - triazine, 2-chloro-4 - (o - vinylphenoxy) - 6 - phenoxy - triazine, 2,4-dichloro - 6 - (p-allylphenoxy) - triazine, and 2-chloro-4,6 - bis(p-methallylphenoxy) - triazine, 2 - chloro - 4,6-bis(2 - vinyl - α - naphthoxy) - triazine, 2,4-dichloro-6-(5-propenyl-β-naphthoxy)-triazine and the like.

In a preferred embodiment of the 1,3,5-triazine fungicides of my invention I substitute the aryloxy group with chlorine atoms. However, when I employ more than four such chlorine atoms on each aryloxy group I have found that the activating effect of such substitution tends to be offset and either reduced activity is exhibited or secondary, undesirable effects are produced. Among the aryloxy triazines of this invention I prefer to employ 2 - chloro-4,6-bis(4 - chlorophenoxy) - triazine, 2-chloro-4,6 - bis(3 - chlorophenoxy) - triazine, 2 - chloro - 4,6-bis(2 - chlorophenoxy) - triazine, 2-chloro - 4,6 - bis(2,4-dichlorophenoxy) - triazine, 2 - chloro - 4,6 - bis(2,3 - dichlorophenoxy) - triazine, 2-chloro - 4,6 - bis(2,5-dichlorophenoxy) - triazine, 2 - chloro - 4,6 - bis(2,6 - dichlorophenoxy) - triazine, 2 - chloro - 4,6 - bis(3,4 - dichlorophenoxy) - triazine, 2 - chloro - 4,6 - bis(3,5 - dichlorophenoxy) - triazine, 2 - chloro - 4,6 - bis(2,3,4 - trichlorophenoxy) - triazine, 2 - chloro - 4,6 - bis(2,3,5 - trichlorophenoxy) - triazine, 2 - chloro - 4,6 - bis(2,4,6-trichlorophenoxy) - triazine, 2 - chloro - 4,6 - bis(2,3,6-trichlorophenoxy) - triazine, 2 - chloro - 4,6 - bis(2,4,6-trichlorophenoxy) - triazine, 2-chloro - 4,6 - bis(2,3,4,5-tetrachlorophenoxy)-triazine, 2-chloro - 4,6 - bis(2,3,4,6-tetrachlorophenoxy) - triazine, 2,4 - dichloro - 6 - (4-chlorophenoxy) - triazine, 2,4 - dichloro - 6 - (3 - chlorophenoxy) - triazine, 2,4 - dichloro - 6 - (2 - chlorophenoxy) - triazine, 2,4 - dichloro - 6 - (2,4 - dichlorophenoxy) - triazine, 2,4 - dichloro - 6 - (2,3 - dichlorophenoxy) - triazine, 2,4 - dichloro - 6 - (2,5 - dichlorophenoxy) - triazine, 2,4 - dichloro - 6 - (2,6 - dichlorophenoxy) - triazine, 2,4 - dichloro - 6 - (3,4 - dichlorophenoxy) - triazine, 2,4 - dichloro - 6 - (3,5 - dichlorophenoxy) - triazine, 2,4 - dichloro - 6 - (2,3,4 - trichlorophenoxy) - triazine, 2,4 - dichloro - 6 - (2,3,5 - trichlorophenoxy) - triazine, 2,4 - dichloro - 6 - (2,4,5 - trichlorophenoxy) - triazine, 2,4 - dichloro - 6 - (2,3,6 - trichlorophenoxy) - triazine, 2,4 - dichloro - 6 - (2,4,6 - trichlorophenoxy) - triazine, 2,4 - dichloro - 6 - (2,3,4,5 - tetrachlorophenoxy) - triazine, 2,4 - dichloro - 6 - (2,3,5,6 - tetrachlorophenoxy) - triazine, 2 - chloro - 4,6 - bis(α - (2-chloronaphthoxy)) - triazine, 2 - chloro - 4,6 - bis(β-(1 - chloronaphthoxy)) - triazine, 2-chloro - 4,6 - bis(α-(2,3 - dichloronaphthoxy)) - triazine, 2 - chloro - 4,6-bis(α - (2,5 - dichloronaphthoxy)) - triazine, 2 - chloro-4,6 - bis(α - (2,6 - dichloronaphthoxy)) - triazine, 2,4-dichloro - 6 - (α - (2 - chloronaphthoxy)) - triazine, 2,4-dichloro - 6 - (β - (1 - chloronaphthoxy)) - triazine, 2,4-dichloro - 6 - (α - (2,3 - dichloronaphthoxy)) - triazine, 2,4 - dichloro - 6 - (α - (2,5 - dichloronaphthoxy)) - triazine, 2,4-dichloro - 6 - (α - (2,6 - dichloronaphthoxy))-triazine and mixed chloroaryloxy compounds, for example such as 2 - chloro - 4 - (4 - chlorophenoxy) - 6-phenoxy - triazine, 2 - chloro - 4 - (2,5 - dichlorophenoxy) - 6 - (4 - chlorophenoxy) - triazine, 2 - chloro - 4 - (α - (1 - chloronaphthoxy)) - 6 - (2,3,4,5 - tetrachlorophenoxy) - triazine, 2 - chloro - 4 - (p - tolyloxy) - 6 - (4 - chlorophenoxy) - triazine, 2 chloro - 4 - (2 - methyl-4-chlorophenoxy)-6-(2,3,4-trichlorophenoxy)-triazine and the like.

In general the active ingredient of my fungicidal compositions can be portrayed as

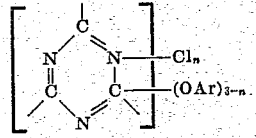

wherein Ar is an aryl radical substituted or not, for example with a hydrocarbon group or chlorine, that is, Ar is a radical selected from the group consisting of phenyl, naphthyl, hydrocarbon-substituted phenyl, hydrocarbon-substituted naphthyl, chloro-substituted phenyl and chloro-substituted naphthyl radicals, and $n$ is an integer from 1 to 2 inclusive. In the embodiment wherein the aryloxy group is chlorine substituted the fungicidal ingredient can be portrayed as

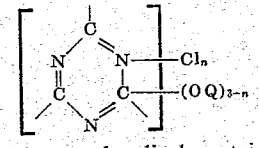

wherein Q is a chloro aryl radical containing one to four chlorine atoms inclusive, and $n$ is an integer from 1 to 2 inclusive.

In the protection of susceptible materials from fungus attack it is usually not sufficient to provide an agent which has the power of destroying fungi or preventing the germination or sporulation thereof. Other properties such as for example low toxicity to mammals, prolonged weathering resistance, non-staining or discoloring characteristics, low phytotoxicity, and low or controlled volatility must be considered before a fungitoxicant can achieve commercial utility. It is for these and other reasons that it is advisable in many instances to provide the fungicidal agents of my invention with more than those essential groups that I have found to provide the fungitoxic property.

One general method for the preparation of the fungicidal triazines of my invention wherein the triazine is mono-substituted with an aryloxy radical and disubstituted with chlorine consists of reacting cyanuric chloride with the appropriate phenol. A satisfactory method comprises treating an aqueous suspension of cyanuric chloride at about 0° C. with an aqueous solution of the phenol. The product, 2,4-dichloro-6-aryloxy-triazine, can be readily recovered in good yield and acceptable purity by a filtration process. To prepare the 2-chloro-4,6-bis(aryloxy)-triazine fungicides of my invention I prefer to further treat the reaction mixture as above with a second stoichiometric equivalent of the same or different phenol in aqueous alkali, at a slightly elevated temperature, for example, 15 to 50° C. This product can likewise be recovered by a simple filtration step.

In the following examples of methods I have employed in preparing typical representatives of the active ingredients of the fungicides of my invention all parts and percentages are by weight.

EXAMPLE I

*2,4-dichloro-6-(2,4-dichlorophenoxy)-s-triazine.*—To a reaction vessel equipped with a mechanical agitator, means for recording temperature and introducing liquid reactant, and containing a mixture of 200 parts of water and 400 parts of ice was added a solution of 37 parts of cyanuric chloride in 140 parts of acetone over a period of about 15 minutes while agitating the mixture. To the resulting suspension of cyanuric chloride while maintaining the temperature at 0 to 5° C. was added over a period of 30 minutes a solution previously prepared of 32.6 parts of 2,4-dichlorophenol in 100 parts of water containing 8 parts of sodium hydroxide. After addition was complete the mixture was stirred for an additional hour maintaining the temperature at 0 to 5° C. The product, 2,4-dichloro-6-(2,4-dichlorophenoxy)-s-triazine, was recovered by filtration and, after washing with 600 parts of water, was dried. The resulting white solid was 58.5 parts, having a melting point of 117 to 122° C. and corresponding to a yield of 94 percent. Further purification resulted when this material was recrystallized from hexane producing white crystals having a melting point of 122 to 123° C. This material contained 45.5 percent chlorine while the theoretical chlorine content of the compound $C_9H_3N_3OCl_4$ is 45.6 percent.

EXAMPLE II

*2-chloro-4,6-bis(2,4-dichlorophenoxy)-s-triazine.*—By a series of operations similar to Example I, 37 parts of cyanuric chloride was reacted with 32.6 parts of 2,4-dichlorophenol. After continuing agitation of the resulting mixture at a temperature of 0 to 5° C. for one hour, the temperature of the reaction mixture was increased to about 15 to 20° C. At this temperature and with agitation a second portion of 32.6 parts of 2,4-dichlorophenol, 100 parts of water and 8 parts of sodium hydroxide was added during a period of 10 minutes to the suspension of 2,4 - dichloro-6-(2,4 - dichlorophenoxy)-s-triazine. Agitation was continued at a temperature of 20 to 25° C. for 30 minutes whereupon the temperature was increased to 35 to 40° C. and the reaction mixture was agitated for an additional hour. The reaction mixture was cooled to a temperature of 20 to 25° C. and the product, 2-chloro-4,6-bis(2,4-dichlorophenoxy)-s-triazine, was recovered by filtration, washed with water and dried. This white solid was 87 parts, having a melting point of 160 to 170° C. and corresponding to a yield of 99.3 percent. Further purification was achieved by recrystallizing this product from a mixture of benzene and hexane to produce white crystals melting at 172 to 173° C. This material contained 39.9 percent chlorine while the formula

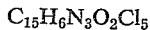
$C_{15}H_6N_3O_2Cl_5$ requires 40.5 percent chlorine.

To prepare mixed chloro aryloxy triazines I employed a different phenol in the second step as in the above example. Thus, when the suspension of 2,4-dichloro-6-(2,4-dichlorophenoxy)-s-triazine prepared as above is treated with 25.2 parts of p-chlorophenol in 100 parts of water containing 8 parts of sodium hydroxide at a temperature of 20 to 40° C. for a period of one and one-half hours, 2-chloro-4-(2,4-dichlorophenoxy)-6-(4-chlorophenoxy)-s-triazine is obtained in high yield and purity.

EXAMPLE III

*2,4-dichloro-6-phenoxy-s-triazine.*—To a reaction vessel similar to that employed in Example I a solution of 92.2 parts of cyanuric chloride in 330 parts of acetone was added to a slurry of 1,000 parts of ice. To the resulting suspension was added over a period of one hour a previously prepared solution of 47.1 parts of phenol, 380 parts of water and 20 parts of sodium hydroxide. Upon completion of the addition, the reaction mixture was stirred for a period of 1.5 hours during which time the temperature increased to 20° C. This material upon filtration, washing with water and drying, was 78.7 parts, corresponding to a yield of 65 percent and melting at a temperature of 89° C. Upon recrystallization from a mixture of hexanes white crystals were obtained melting at 88 to 109° C. Analysis showed the material to contain 20.3 percent chlorine.

EXAMPLE IV

*2,4 - dichloro - 6-(2,4,5 - trichlorophenoxy)-s-triazine.*—Following the procedure of Example III, 2,4-dichloro-6-(2,4,5-trichlorophenoxy)-s-triazine was prepared by treating cyanuric chloride with 2,4,5-trichlorophenol in a yield corresponding to 84.1 percent of crystalline product melting at 124 to 135° C. This material contained 50.8 percent chlorine compared to the requirement of 51.3 percent chlorine for the formula $C_9H_2ON_3Cl_5$.

Polychlorophenols obtained from the products of benzene hexachloride cracking are a particularly suitable source of raw materials for the manufacture of my chloro polychlorophenoxy triazines. With increased manufacture of high gamma benzene hexachloride and lindane, a large amount of insecticidally inactive, or waste isomers, of benzene hexachloride are available. When such materials, or even the whole benzene hexachloride or individual isomers thereof, are dehydrochlorinated, 1,2,4-, 1,2,3- and to a lesser extent 1,3,5-trichlorobenzenes are produced. When such mixtures or the individual isomers are hydrolyzed, dichlorophenols are produced which, when reacted with cyanuric chloride according to the procedure of Examples I and II, produce 2,4-dichloro-6-dichlorophenoxy-s-triazines and 2-chloro-4,6-bis(dichlorophenoxy)-s-triazines respectively which are extremely effective as fungicides when used in accordance with my invention. Furthermore, such trichlorobenzenes when further chlorinated to tetra- and pentachlorobenzenes and hydrolyzed to the corresponding tri- and tetrachlorophenols form particularly suitable materials to produce the corresponding chloro-trichlorophenoxy- and chloro-tetrachlorophenoxy-triazine fungicides of my invention.

EXAMPLE V

*2,4 - dichloro-6-(β-naphthoxy)-s-triazine.*—By reacting β-naphthol with cyanuric chloride according to the procedure of Example III 2,4-dichloro-6-(β-naphthoxy)-s-triazine was produced in 87.8 percent yield of material melting at 145 to 154° C., this material having been crystallized from trichloroethylene. The product contained 22.3 percent chlorine while the formula

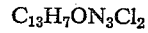
$C_{13}H_7ON_3Cl_2$ requires 24.3 percent chlorine.

EXAMPLE VI

*2,4 - dichloro-6-(p-chlorophenoxy)-s-triazine.*—By following the procedure of Example I, 37 parts of cyanuric chloride was reacted with 25.8 parts of p-chlorophenol, at a temperature of 5° C. to produce 2,4-dichloro-6-(p-chlorophenoxy)-s-triazine as a white crystalline solid in a yield of over 90 percent.

EXAMPLE VII

*2,4 - dichloro - 6 - (2,3,4,6-tetrachlorophenoxy)-s-triazine.*—By following the procedure of Example I, 37 parts of cyanuric chloride suspended in ice-water-acetone mixture was reacted with 46.4 parts of 2,3,4,6-tetrachlorophenol to produce 2,4 - dichloro-6-(2,3,4,6-tetrachlorophenoxy)-s-triazine in 90 percent yield as a crystalline solid having a chlorine content equivalent to the formula $C_9HN_3OCl_6$.

In addition to the aryloxy group, the fungicidal 1,3,5-triazines of my invention contain at least one chlorine atom on a carbon atom of the triazine nucleus. The choice of whether one or two chlorine atoms and one or two aryloxy groups be provided depends largely upon the type of application and the particular fungus organism which it is desired to destroy or inhibit from sporulating. I have determined that the various embodiments of my triazine fungicides are effective against fungus organisms with little or no selectivity. Although there is a measurable difference in the rate at which my fungicides attack various fungus organisms, this can be readily determined by test. This difference is a matter of degree and providing that the minimum amount of fungicide is applied, protection is obtained against a wide variety of organisms by any one of my fungicides, as well as mixtures thereof.

In order to obtain practical benefit from the inherent fungicidal activity of the above defined 1,3,5-triazines, I employ my compounds as formulations with relatively inert, surface-contacting agents, diluents, extenders or adjuvants. In the pure state the above compounds are many thousand-fold too effective or too potent to have any practical utility as fungicides. For example, in order to most effectively protect a surface such as a painted or wood surface, or the surface of a fruit, stem or leaf, or a concrete or other surface, it is necessary to apply my materials in intimate contact but thoroughly dispersed on the surface thereof. Likewise, in treating more or less porous material such as cloth, felted textiles and woven fibers, it is important that my materials be interspersed between the fine structure of such materials and be in intimate contact therewith. Therefore, in order to benefit from my discovery that the defined materials are effective fungicides, I incorporate therewith a substantially greater amount of a relatively inert surface-contacting agent, carrier, extender or diluent. Furthermore, such surface-contacting agents have the effect of requiring only minute quantities of the above-defined compounds to obtain effective protection. A further advantage of so extending these materials is to permit field application by methods readily employed and still obtain effectively complete coverage of the material being protected.

One method of applying my fungicides is in the form of a water suspension. However, to obtain a fungicidally active aqueous suspension, I employ a surface-active agent in sufficient amount to disperse and suspend the fungicidal agent. Examples of such surface-active agents which can be employed in forming dispersions include salts of the alkyl and alkylaryl sulfonates, such as Du Pont MP–189 and Nacconol–NR, alkyl sulfates, such as Dreft, alkylamide sulfonates, such as Igepon–T, the alkylaryl polyether alcohols, such as Triton X–100, the fatty acid esters of polyhydric alcohols, such as Span, the ethylene oxide addition products of such esters, as for example Tween, and the addition products of long-chain mercaptans and ethylene oxide, such as Sharples Non-Ionic–218. Still other surface-active agents can be employed, the above merely showing a representative list of the more common materials.

In the examples of my fungicidal compositions which follow all parts are parts by weight.

EXAMPLE VIII

A formulation of 2-chloro-4,6-bis(2,4-dichlorophenoxy)-s-triazine was prepared by finely grinding 10 parts of this material and adding the resulting powder to 1000 parts of water containing one part of Tween–80 with vigorous agitation. This concentrate dispersion was further diluted 1000 times by the addition of water to obtain a formulation of suitable concentration for application. Thus the resulting dispersion contained 10 p. p. m. of my fungicide in the water dispersion. It was found to have excellent fungicidal properties when applied to tomato, corn, and bean plants by spraying or dipping.

In a similar manner I prepared aqueous dispersions at concentrations of 0.1, 1.0, 10 and 100 p. p. m. of the following fungicides of my invention: 2-chloro-4,6-bis(phenoxy)-s-triazine, 2,4-dichloro-6-(p-chlorophenoxy)-s-triazine, 2,4-dichloro-6-(p-tolyloxy)-s-triazine, 2,4-dichloro-6-(β-naphthoxy)-s-triazine, 2-chloro-4,6-bis(2,5-dichlorophenoxy)-s-triazine and 2-chloro-4,6-bis(2,3,4,5-tetrachlorophenoxy)-s-triazine. Similar aqueous dispersions of the following fungicides of my invention are also made with equally good results: 2-chloro-4,6-bis(9-phenanthryloxy)-s-triazine, 2,4-dichloro-6-(3-dodecylphenoxy)-s-triazine, 2-chloro-4,6-bis(p-vinylphenoxy)-s-triazine, 2,4-dichloro-6-(p-allylphenoxy)-s-triazine, 2-chloro-4-phenoxy-6-(4-chlorophenoxy)-s-triazine, and 2-chloro-4-(2,4-dichlorophenoxy)-6-(α-naphthoxy)-s-triazine. In each instance these compositions possessed exceptionally good fungicidal properties.

The solubility of the s-triazines in organic solvents, furthermore, is such that they can be applied advantageously in the form of solutions in this type of solvent, and for certain uses this method of application is preferred. For example, in treating cloth, leather or other fibrous articles we prefer to apply my fungicides dissolved in a volatile solvent. After application the volatile solvent evaporates, leaving the fungicidal agent impregnated throughout the surface of the article and in the dispersed form which I have found to be most advantageous. Likewise, applying my fungicides to smooth surfaces, as for example in treating wood surfaces for protection against fungus attack, or to inhibit fungus growths on damp concrete surfaces, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for my active agents I use hydrocarbons, such as benzene, xylene or toluene; ketones such as acetone, methylethyl ketone and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which I employ are the Carbitols and Cellosolves, the former comprising in general the monoakyl ethers of diethylene glycol and the latter the monoalkyl ethers of ethylene glycol. In addition, combinations of these various typical solvents can be employed whereby special volatility and viscosity characteristics can be imparted to my formulations.

EXAMPLE IX

A solution consisting of 5 parts of 2,4-dichloro-6-(4-chlorophenoxy)-s-triazine in 250 parts of cyclohexanone was prepared by stirring the two constituents for a period of fifteen minutes at a temperature of about 25° C. This concentrated solution, suitable for storage or transportation, was further diluted with 99,750 parts of kerosene to form a final dilution of 50 p. p. m. suitable for application and having excellent fungicidal activity.

Similarly concentrated solutions of 2-chloro-4,6-bis-(phenoxy)-s-triazine, 2,4-dichloro-6-phenoxy-s-triazine, 2-chloro-4,6-bis(α-naphthoxy)-s-triazine, 2-chloro-4,6-bis(p-vinylphenoxy)-s-triazine, 2-chloro-4,6-bis(2,3,5-trichlorophenoxy)-s-triazine, 2-chloro-4-(o-chlorophenoxy)-6-(3-chlorophenoxy)-s-triazine, 2,4-dichloro-6-(2,3,4,5-tetrachlorophenoxy)-s-triazine and 2-chloro-4-(phenoxy)-6-(β-(1-chloronaphthoxy))-s-triazine are prepared in each of the following solvents, ethyl acetate, kerosene, perchloroethylene and Cellosolve, and final dilutions for application are prepared by the addition of further quantities of kerosene with equally good results. The final products protect surfaces to which they are applied from fungus growths for extended periods of time.

In addition to the above-described methods of wet application of the 1, 3, 5-triazines, I can prepare compositions in which my materials are extended in talc, clay, cellulosic powders or other solid diluents. Such formulations have particular utility in the treatment of seeds, wherein an aqueous application may promote premature germination, or where a solvent application may damage the seed. For certain field crop application I also prefer a dust formulation wherein a wet application might introduce a certain secondary effect which is undesirable. Further specific examples of such typical inert solid carriers which can be employed as diluents in my dust formulations include fuller's earth, pyrophillite, bentonite, montmorillonite, Attaclay, the Filtrols, Celite and the like.

EXAMPLE X

A dust formulation of one of my fungicides was prepared as follows: Equal parts of 2,4-dichloro-6-(2,4,5- trichlorophenoxy)-s-triazine and fuller's earth were placed in a hammer mill. This mixture was milled for a period of one hour and screened to collect a fraction passing a 325-mesh sieve. This fifty percent by weight formulation is stable and can be stored and shipped as such. A further dilution was made for application by milling two parts of the above formulation with an additional 98 parts of fuller's earth. The product had excellent fungicidal properties.

Similar dust formulations are prepared from the following compounds: 2,4-dichloro-6-phenoxy-s-triazine, 2,4-dichloro-6-(α-naphthoxy)-s-triazine, 2,4-dichloro-6-(2,4-dichlorophenoxy)-s-triazine, 2-chloro-4, 6-bis(p-chlorophenoxy)-s-triazine, 2,4-dichloro-6-(4-chloro-o-tolyloxy)-s-triazine, 2-chloro-5-phenoxy-6-(o-chlorophenoxy)-s-triazine, 2-chloro-4,6-bis(2,4-dichlorophenoxy)-s-triazine and 2-chloro-4,6-bis(p-phenylphenoxy)-s-triazine, by treating them in a hammer mill as above with Filtrol with equally good results.

For certain applications I prefer to employ my fungicides in the form of oil-in-water emulsions. Thus, a concentrate of the fungicidal agent is prepared in a water-insoluble solvent and this solution is then dispersed or emulsified in water containing a surface-active agent. Typical examples of such solvents include hydrocarbons, such as kerosene, benzene or naphtha, higher alcohols, such as butanol, oleyl alcohol or ethers and esters thereof, and chlorinated solvents, such as perchloroethylene, and trichloroethylene.

EXAMPLE XI

An oil-in-water emulsion was prepared by dissolving 10 parts of 2,4-dichloro-6-(β-naphthoxy)-s-triazine in 1000 parts of kerosene. This solution was dispersed with vigorous agitation in 99,000 parts of water containing 5 parts of Triton X-100, to provide a dispersion containing 10 p. p. m. of active agent which had excellent fungicidal properties.

When similar solutions of 2,4-dichloro-6-phenoxy-s-triazine, 2-chloro-4-phenoxy-6-(4-hydrindenyloxy)-s-triazine, 2,4-dichloro-6-(o-propenylphenoxy)-s-triazine, 2-chloro-4,6-bis(2-vinyl-α-naphthoxy)-s-triazine, 2-chloro-4,6-bis(2,4-dichlorophenoxy)-s-triazine and 2,4-dichloro-6-(p-chlorophenoxy)-s-triazine are prepared in kerosene, naphtha and trichloroethylene followed by dispersion in water equally satisfactory emulsions having excellent fungicidal properties, are obtained.

Further, I have discovered that it is possible to employ a combination of the above methods of application of my fungicides. Thus, I can incorporate a surface-active agent in my dust formulations to provide a wettable powder, which can then be suspended in an aqueous or other liquid medium. Of particular utility for such formulations are the alkyl or alkylaryl sulfonate detergents.

EXAMPLE XII

A mixture of 100 parts of 2,4-dichloro-6-(2,4,5-trichlorophenoxy)-s-triazine, 1000 parts of Attaclay and 0.1 part of Nacconol was milled through a hammer mill and the resulting powder sieved to pass a 100-mesh screen. This 10 percent wettable powder produced a satisfactory water suspension having good fungicidal properties when 11 parts were stirred into 10,000 parts of water to produce a suspension containing 100 p. p. m. active ingredient. Similar wettable powders with Filtrol, fuller's earth and pyrophyllite are prepared by milling as above 2-chloro-4,6-bis(2,5-dichlorophenoxy)-s-triazine, 2,4-dichloro-6-(α-(4-chloronaphthoxy))-s-triazine, 2-chloro-4-phenoxy-6-(4-chlorophenoxy)-s-triazine, 2-chloro-4,6-bis(2,4-dichlorophenoxy)-s-triazine, 2,4-dichloro-6-(5-propenyl-β-naphthoxy)-s-triazine, 2,4-dichloro-6-(α-naphthoxy)-s-triazine and 2-chloro-4-(2,4-dimethylphenoxy)-6-phenoxytriazine, and Tween-80 followed by screening. In each instance they possessed satisfactory fungicidal properties.

Likewise, a solvent formulation can be employed along with water, or water and a surface-active agent. Such surface-active agents are chosen, for example, from the types represented by Triton X-100, Sharples Non-Ionic-218 or Tween.

EXAMPLE XIII

A solution of 100 parts of 2,4-dichloro-6-(p-tolyloxy)-s-triazine, 500 parts of ethyl acetate and 5 parts of Tween-20 was prepared by stirring the ingredients at 25° C. for one-half hour. This solution was then added with agitation to 9.395 parts of water to provide a good fungicidal dispersion suitable for application.

Equally good dispersions having excellent fungicidal properties are obtained when 2-chloro-4,6-bis(phenoxy)-s-triazine, 2,4-dichloro-6-phenoxy-s-triazine, 2,4-dichloro-6-(p-phenylphenoxy)-s-triazine, 2,4-dichloro-6-(o-propenylphenoxy)-s-triazine, 2,4-dichloro-6-(p-chlorophenoxy)-s-triazine, 2-chloro-4,6-bis(2,4,5-trichlorophenoxy)-s-triazine and 2-chloro-4,6-bis(mixed-trichlorophenoxy)-s-triazine are dissolved in methanol, acetone, and methyl ethyl ketone along with Triton X-100 and added with agitation to water.

In addition I have found that I can incorporate an adherent or stocking agent such as vegetable oils, naturally occurring gums, and other adhesives in our 1,3,5-triazine formulations. Likewise, I can employ humectants in my formulations. Furthermore, these formulations can be employed in admixture with other fungicidal materials or other biocides such as insecticides, larvicides, bactericides, vermicides, miticides, or with other materials which it is desired to apply along with my fungicide, such as for example herbicides or fertilizers.

I have illustrated the utility of my fungicides as fungitoxic materials by determining the concentration at which the germination of 50 percent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of my fungicides to protect these and other important agricultural crops. These tests were conducted as follows:

An aqueous suspension of the fungicidal agent in distilled water containing a dispersant was prepared according to the method of Example VIII. This suspension, at various dilutions with distilled water was applied to a drop of water containing the test organism on a microscope slide. The concentration was thereby determined at which one-half of the fungi were prevented from sporulating. This standard slide-germination method is described and accepted by the Committee on Standardization of fungicidal tests of the American Phytopathological Society in "Phytopathology," 33, 627 (1943).

*Table I*

| No. | Fungicidal Agent | Concentration (p. p. m.) to inhibit sporulation 50 percent | |
|---|---|---|---|
| | | A. oleracea | S. fructicola |
| 1 | 2,4-Dichloro-6-(2,4,-dichlorophenoxy)-s-triazine. | 5 | 0.5 |
| 2 | 2,4-Dichloro-6-phenoxy-s-triazine | 5 | 0.5 |
| 3 | 2,4-Dichloro-6-(α-naphthoxy)-s-triazine. | 0.3 | 0.7 |
| 4 | 2,4-Dichloro-6-(2,4,5-trichlorophenoxy)s-triazine. | 0.7 | 1.5 |

When the compositions of the preceding examples are tested in the above manner, they are found to have exceptional fungicidal activity.

Of particular importance in the treatment of agricultural crops against fungus diseases is the susceptibility of the plant to damage by the fungitoxicant employed. My materials are particularly advantageous in this respect since in a variety of tests I have found no evidence that my materials are toxic to plants or inhibit the normal functioning of the plant or the germination of seeds when applied in the compositions described in the foregoing. I have demonstrated the innocuous nature of my fungitoxicant formulations by dipping the entire leaf of each corn, soybean, tomato, cucumber and cotton plants in suspensions of my fungicides at concentrations as high as 10,000 p. p. m. and have observed no adverse effect on the so-treated plants or upon the leaves which were dipped. Furthermore, each of these plants was totally sprayed with dispersions of my fungicides in water at a concentration of 10,000 p. p. m. without any deleterious effect on the plant. Even when my fungicides are applied as a lanolin paste to the stem of young plants of the above species no adverse effects were noted.

The effectiveness of my fungicides in protecting growing plants from fungus diseases has been demonstrated by control of the tomato early blight and tomato late blight.

EXAMPLE XIV

This test involves spraying the test plants with 0.2 percent concentration of the fungicide, inoculation with spores of the fungus responsible for the disease, and determination of the number of disease lesions which develop. Bonny Best tomato plants grown in three-inch pots to a height of 4–7 inches were used as host plants. Three replicant plants were used for each compound. The 0.2 percent spray suspensions of the compounds referred to in the preceding examples were made up in 0.01 percent Tween-20 solutions in all cases. The tomato plants were sprayed on a revolving turntable with the fungicide suspension by means of a De Vilbiss paint spray gun. Each turntable load of plants was sprayed with 85 cc. of spray suspension. No appreciable loss of fungicide from the plants because of run-off occurs under these conditions. Under the standard conditions used, a deposit of approximately 0.0015 gm. of fungicide per 100 cm. of total leaf area (i. e., including upper and lower leaf surfaces) is obtained. After the fungicide deposit was allowed to dry, the plants were inoculated with a spore suspension of the test fungus. The spores were obtained from fungus cultures grown on salt-potato-dextrose-agar at 20° C. for 7–14 days. Twenty cc. of a suspension containing 50,000 spores per cc. was used to inoculate each turntable load of plants. The spores were sprayed under an air pressure of 10 p. s. i. by means of a De Vilbiss atomizer held about one foot from the plants. Both the upper and lower leaf surfaces were uniformly inoculated by this method. Following inoculation, the plants were placed in an infection chamber which was maintained at 20° C. and 100 percent relative humidity. After 40–48 hours in this incubation chamber, the plants were removed to a greenhouse bench. Lesions usually developed 3 to 4 days after inoculation. The total number of lesions on three compound leaves of each sprayed plant were determined. Leaves having the same position on the plant were counted for all treatments and the controls. The disease index was obtained by dividing the average number of lesions per replicate sprayed plant by the average number of lesions per control plant. For this purpose a number of young tomato plants were infected with the fungi. This test is further described by Wellman and McCallen, Contri. Boyce Thompson Inst., 13, 171 (1943).

Table II

| No. | Fungicide | Tomato Early Blight | Disease Index—Percent no. of lesions compared to untreated plants (Tomato Late Blight) |
|---|---|---|---|
| 1 | 2,4-Dichloro-6-(α-naphthoxy)-s-triazine. | 3 | 4 |
| 2 | 2,4-Dichloro-6-(2,4,5-trichlorophenoxy)-s-triazine. | 3 | 3 |
| 3 | None (untreated) | 100 | 100 |

From the above results it is apparent that my fungicides are extremely successful in the actual control of a plant disease. Equally good results are obtained when 2-chloro-4,6-bis(β-naphthoxy)-s-triazine, 2 - chloro-4,6-bis(p-chlorophenoxy) - s - triazine, 2 - chloro - 4,6 - bis(2,4 - dichlorophenoxy) - s - triazine, 2,4 - dichloro - 6 - (5-propenyl - α - naphthoxy) - s - triazine, 2 - chloro - 4,6-bis(2,3,4,5 - tetrachlorophenoxy) - s - triazine, 2,4 - dichloro - 6 - (4 - ethylphenoxy) - s - triazine, 2 - chloro-4 - (2,6 - dichlorophenoxy) - 6 - (α - naphthoxy) - s-triazine and 2 - chloro - 4 - phenoxy - 6 - (3 - chlorophenoxy) - s - triazine are similarly employed.

EXAMPLE XV

To indicate the effectiveness of my fungitoxicants in control of plant diseases over a wide range of concentrations wettable powders were prepared and tested at various dilutions against the early and late blight of tomato. Such a wettable powder was prepared for example as follows: 50 parts of 2,4-dichloro-6-(2,4-dichlorophenoxy)-s-triazine was ground in a Weber hammer mill with 48 parts of Celite-209 and 2 parts of Santomerse-D for a period of one hour. The resulting 50 percent wettable powder was passed through a standard sieve and that fraction passing a 325 mesh screen was collected. The particle size distribution of this wettable powder was 5 percent in the range of 6 to 60 microns and 95 percent in the range of 0.5 to 6 microns. This wettable powder was then diluted with water sufficient to prepare three aqueous suspensions containing 2000, 400 and 80 p. p. m. of active ingredient. In the following table the percent control of both early and late tomato blights are shown with this formulation. These determinations were made in the manner described under Example XIV.

| Concentration of active ingredient, p. p. m. | Percent Control | |
|---|---|---|
| | Tomato Early Blight | Tomato Late Blight |
| 2,000 | 100 | 99 |
| 400 | 99 | 99 |
| 80 | 87 | 96 |

EXAMPLE XVI

To illustrate the remarkable weathering characteristics of my fungicides a tenacity determination was made as follows: each of the aqueous suspensions described in Example XV were sprayed according to the procedure of Example XIV on tomato plants. After the application had dried the plants were subjected to one inch of rainfall after which they were inoculated with the spores, according to the procedure of Example VIV, of the fungi responsible for the early and late tomato blight and thereupon incubated. In the following table the percent control obtained after this rigorous treatment is shown. It is apparent by comparison of the following table with that preceding that essentially no diminution of the effectiveness of my materials occurs under conditions such as encountered in agricultural applications.

| Concentration of active ingredient, p. p. m. | Percent Control | |
|---|---|---|
| | Tomato Early Blight | Tomato Late Blight |
| 2,000 | 100 | 100 |
| 400 | 98 | 98 |
| 80 | 81 | 90 |

EXAMPLE XVII

Aqueous suspensions of compound 2,4-dichloro-6-(2,4-dichlorophenoxy)-s-triazine were prepared in concentrations of 2000, 400, 80 and 16 p. p. m. according to the procedure of Example XV. These suspensions were sprayed upon potato plants according to procedure of Example XIV followed by inoculation with the fungi responsible for potato early blight and potato late blight followed by incubation as above. The remarkable control of both diseases is demonstrated in the following table.

| Concentration of active ingredient, p. p. m. | Percent Control | |
|---|---|---|
| | Potato Early Blight | Potato Late Blight |
| 2,000 | 100 | 100 |
| 400 | 100 | 100 |
| 80 | 100 | 94 |
| 16 | 89 | 98 |

EXAMPLE XVIII

Protection of celery plants against the Cercospora early blight was demonstrated in a field application. For this purpose the wettable powder of Example XV was diluted so as to provide two suspensions, one containing 0.5 pound of active ingredient per one hundred gallons of water and one containing 1.5 pounds of active ingredient per one hundred gallons of water. These suspensions were applied at the rate of one gallon per 50 foot of row to celery plants over a period of three months, from December to March, in a planting in Florida. At the end of this time the treated plantings were compared with adjacent plantings of celery which were not treated. The control plantings were infected to the extent of 13 percent with early blight. My materials provided complete protection at the 1.5 pound per hundred gallon level and at the 0.5 pound per hundred gallon level only slightly more than one percent of the plants were so infected.

In general my fungicidal compositions are effective over a wide range of concentrations of the fungicidal 1,3,5-triazine. Thus, at concentrations as high as 50,000 p. p. m., I obtain effective fungicides which are safe for agricultural applications and are particularly suitable for textile and surface coating protection. Even at concentrations as low as 0.1 p. p. m. I obtain protection. Furthermore, I can employ still higher concentrations for certain applications to inanimate objects and can formulate higher concentrations which are stable for storage or handling, for example, in the range of 50 weight percent active ingredient. In general, however, I prefer the range of 0.1 to 10,000 p. p. m. for effective fungicidal use.

Having thus described the fungicidal 1,3,5-triazines of my invention and having demonstrated their utility, illustrated methods of formulating effective fungicidal compositions and methods of applying such formulations, I do not intend that my invention be limited except as by the appended claims.

This application is a continuation-in-part of application Serial No. 279,218, now abandoned.

I claim:

1. A fungitoxic composition consisting essentially of a fungicide having the general formula

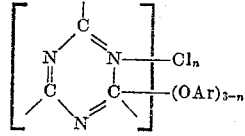

wherein Ar is a radical selected from the group consisting of phenyl, naphthyl, hydrocarbon-substituted phenyl, hydrocarbon - substituted naphthyl, chloro - substituted phenyl and chloro-substituted naphthyl radicals, and $n$ is an integer from 1 to 2 inclusive, an inert fungicidal adjuvant as a carrier therefor and a surface active agent.

2. The composition of claim 1 wherein said fungicidally inert adjuvant is a solvent for said fungicide.

3. The composition of claim 1 wherein said fungicidally inert adjuvant comprises a finely divided solid carrier.

4. A composition consisting essentially of 2,4-dichloro-6-(2,4-dichlorophenoxy)-s-triazine, an inert fungicidal carrier therefor and a surface-active agent.

5. A composition consisting essentially of 2,4-dichloro-6-phenoxy-s-triazine, a fungicidally inert carrier therefor and a surface-active agent.

6. A composition consisting essentially of 2,4-dichloro-6-(α-naphthoxy)-s-triazine, a fungicidally inert carrier therefor and a surface-active agent.

7. A composition consisting essentially of 2,4-dichloro-6-(2,4,5-trichlorophenoxy)-s-triazine, a fungicidally inert carrier therefor and a surface-active agent.

8. The method of preventing sporulation of fungi which consists of subjecting said fungi to the action of a fungitoxicant composition consisting essentially of a fugicide having the general formula

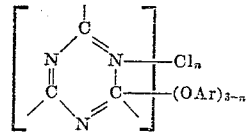

wherein Ar is a radical selected from the group consisting of phenyl, naphthyl, hydrocarbon-substituted phenyl, hydrocarbon - substituted naphthyl, chloro - substituted phenyl and chloro-substituted naphthyl radicals, and $n$ is an integer from 1 to 2 inclusive, and an inert fungicidal adjuvant as a carrier therefor and a surface active agent.

9. The composition of claim 1 wherein said fungicidally inert adjuvant comprises an inert liquid.

10. The composition of claim 1 wherein said fungicidally inert adjuvant comprises a mixture of a hydrocarbon oil and water in which said fungicide is colloidally dispersed.

11. The composition of claim 1 wherein said fungicidally inert adjuvant comprises water.

References Cited in the file of this patent

UNITED STATES PATENTS

| 2,503,999 | Cairns | Apr. 11, 1950 |
| 2,510,564 | Dudley | June 6, 1950 |
| 2,537,816 | Dudley | Jan. 9, 1951 |
| 2,657,169 | Ligett | Oct. 27, 1953 |

OTHER REFERENCES

Schaeffer: J. of the Am. Chem. Soc., vol. 73 (1951), pp. 2990–2992.

Hirt: Helv. Chim. Acta, vol. 33 (1950) pp. 1365–1369.